United States Patent [19]

Makowski

[11] Patent Number: 4,905,519
[45] Date of Patent: Mar. 6, 1990

[54] INTERFEROMETRIC VIBRATION SENSOR

[75] Inventor: M. David Makowski, Redondo Beach, Calif.

[73] Assignee: Hughes Aircraft Company, Los Angeles, Calif.

[21] Appl. No.: 20,421

[22] Filed: Mar. 2, 1987

[51] Int. Cl.$^4$ ............................................. G01N 29/00
[52] U.S. Cl. ........................................ 73/657; 356/349
[58] Field of Search ................ 73/651, 652, 653, 655, 73/657, 659, 517 AV; 356/358, 349

[56] References Cited

U.S. PATENT DOCUMENTS

| 3,635,562 | 1/1972 | Catherin | 356/358 |
| 4,013,366 | 3/1977 | Philbert | 356/358 |
| 4,567,771 | 2/1986 | Nelson et al. | 73/653 |
| 4,777,825 | 10/1988 | Barr et al. | 73/657 |

Primary Examiner—Stewart J. Levy
Assistant Examiner—Louis M. Arana
Attorney, Agent, or Firm—William J. Streeter; A. W. Karambelas

[57] ABSTRACT

A vibration sensor (12) comprises a small flat mirror (72) bonded to a thin metal sheet or beam (68) at the beam's centroid. The beam is clamped at its opposite edges by screws (70) to form a fixed beam with the flat mirror at its midspan, to permit the mirror to move in the direction of its normal, along an axis (54). The beam-mirror assembly, as bolted to a block (34) is placed upon an optical table (12) for measurement of vibrations, thereon. Securement of block (34) between one of its surfaces (38, 44) and with and without a deflecting mirror (66) permits axis (54) to be placed in any one of three orthogonal directions, in order to obtain the orthogonal components of any vibrations exerted upon optical table (12). The components of the vibration in terms of amplitude and frequency are obtained by use of a laser (14), detector (16), a piezoelectric transducer (18), a beam splitter (20), all secured to table (10) and their associated electronic equipment, including a frequency analyzer (80), which constitute a modified Michelson interferometer.

14 Claims, 2 Drawing Sheets

INTERFEROMETRIC VIBRATION SENSOR

BACKGROUND OF THE INVENTION

This invention was made with Government support under contract F29601-85-C-0106 awarded by the Department of the Air Force. The Government has certain rights in this invention.

The present invention relates to a sensor for measuring vibrations on such devices as optical tables and cryogenic coolers and, more particularly, to such a sensor operating as a seismic reference operating in conjunction with an interferometer.

Vibration measuring instruments are required in the design of optical breadboards, brassboards, test benches, etc., where high dimensional stability is required. For example, interferometry and holography usually require optical path variations of less than 1/20th wave length. Because each path of an interferometer may have several optical elements, a systematic method for design and analytical prediction of dimensional stability must be employed. The estimation of dynamic stability has been difficult because the stimuli and response of such systems are often unpredictable, random and/or noisy. The typical solution is to predict responses based on probability distributions such as means, spectra or correlation functions. In general, the average characteristics of the response are determined for a class of inputs, which can be complex, inexact and lengthy. Conventional vibration measurements utilize instruments which determine the motion of a vibrating body by placing a seismic mass, which is mounted on springs, on the body and by measuring the relative displacements of the body and the mass. The measurement is usually made by resistance or capacitance probes. A device which contains these components is called an accelerometer. The accuracy of the measurements of the motions is dependent upon the sensitivity of the measurement technique. The most sensitive commercial accelerometers are able to resolve accelerations of 2 to 3 microgravities ($\mu G$) over a dynamic range of 0 to 100 Hertz. Such sensitivity did not enable sufficiently precise measurements on the optical table to be made and, therefore, the ability to obtain test results utilizing the optical table were reduced to that degree by which undesired vibrations thereon could be determined.

Therefore, a need for making accurate disturbance measurements was required in order to derive good model predictions.

SUMMARY OF THE INVENTION

These and other considerations are successfully addressed in the present invention by affixing a single degree of freedom vibrating reflector, acting as a seismic reference, to the object subject to vibrations, for example an optical table. Reflections from the vibrating reflector are monitored by an interferometer to enable measurement of one component of the motion of the object. By reorienting the vibrating reflector in each of three orthogonal directions, the magnitude and direction of the object's motion can be measured.

Specifically, a preferred vibration reflector comprises a flat mirror bonded to a thin metal sheet at its centroid. The metal sheet is clamped at its opposed edges to form a fixed beam with the mirror at the midspan of the beam, to allow vibration of the mirror along a line which is perpendicular to the plane of the mirror. The vibrating beam and mirror assembly is clamped to a large base, which is placed upon the optical table. The unidirectional motion of the mirror relative to the vibrating base and the optical table is measured in order to derive the amplitude and frequency of the vibrations. By reorienting the base and its secured vibrating beam-mirror assembly in the two remaining orthogonal positions with respect to the table, a three-dimensional model of the amplitude and frequency of the vibrations can be determined. This information is then used to predict accurately the dynamic performance of the optical system without inclusion of errors derived from vibrational disturbances exerted on the table.

Several advantages are derived from the above. Accurate disturbance measurements with a sensor sensitivity of 0.01 microgravities and less is obtainable. The result is for accurate measurements utilizing the optical table or similar device, so as to derive good model predictions.

Other aims and advantages, as well as a more complete understanding of the present invention, will appear from the following explanation of an exemplary embodiment and the accompanying drawings thereof.

DETAILED DESCRIPTION OF THE PREFERRED EMBODIMENT

Figure 1:
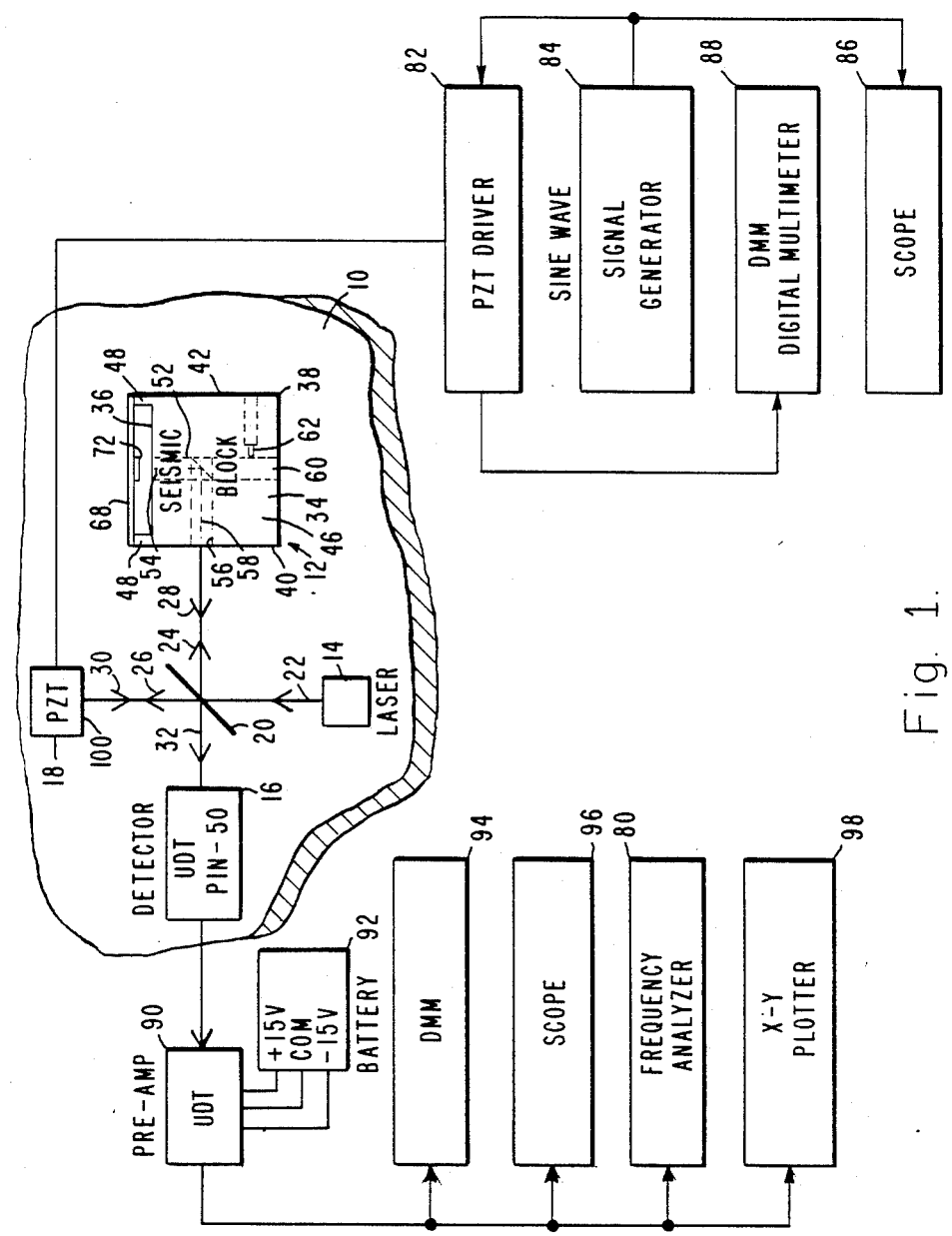
FIG. 1 is a block diagram illustrating a test arrangement including the inventive vibration sensor for determining vibrational disturbances exerted on an object, such as on an optical table or cryogenic cooler.

As shown in FIG. 1, indicium 10 identifies an object, such as an optical table or cryogenic cooler, whose vibrational disturbances are to be measured. Such a vibrational disturbances include any vibrations exerted by the environment in which table 10 is placed. For example, some optical measurements must be taken in an air conditioned environment where machinery therefor as well as other equipment, for example, laser equipment and its cooling system, produce vibrations. Knowledge of such vibration must be obtained to omit it from any test results from use of the optical table during experiments conducted on it.

To obtain information of such vibrations, a vibration sensor 12, a laser 14, a detector 16, a piezoelectric transducer 18 and a beam splitter 20 are fixedly secured to table 10. Vibration sensor 12, sometimes referred to a seismic block, which will be described in greater detail hereinafter, is designed to detect and respond to unidirectional components of vibrations exerted upon table 10. These unidirectional components are detected by directing a beam of electromagnetic energy 22 from laser 14 to beam splitter 20. Beam 22 is then split into two beam components having the directions indicated by arrows 24 and 26, respectively toward sensor 12 and piezoelectric transducer 18. Reflection of these beams from sensor 12 and piezoelectric transducer 18 are respectively noted by arrows 28 and 30 and are directed toward detector 16 as denoted by beam 32 in the direction of the arrow.

Figure 2:
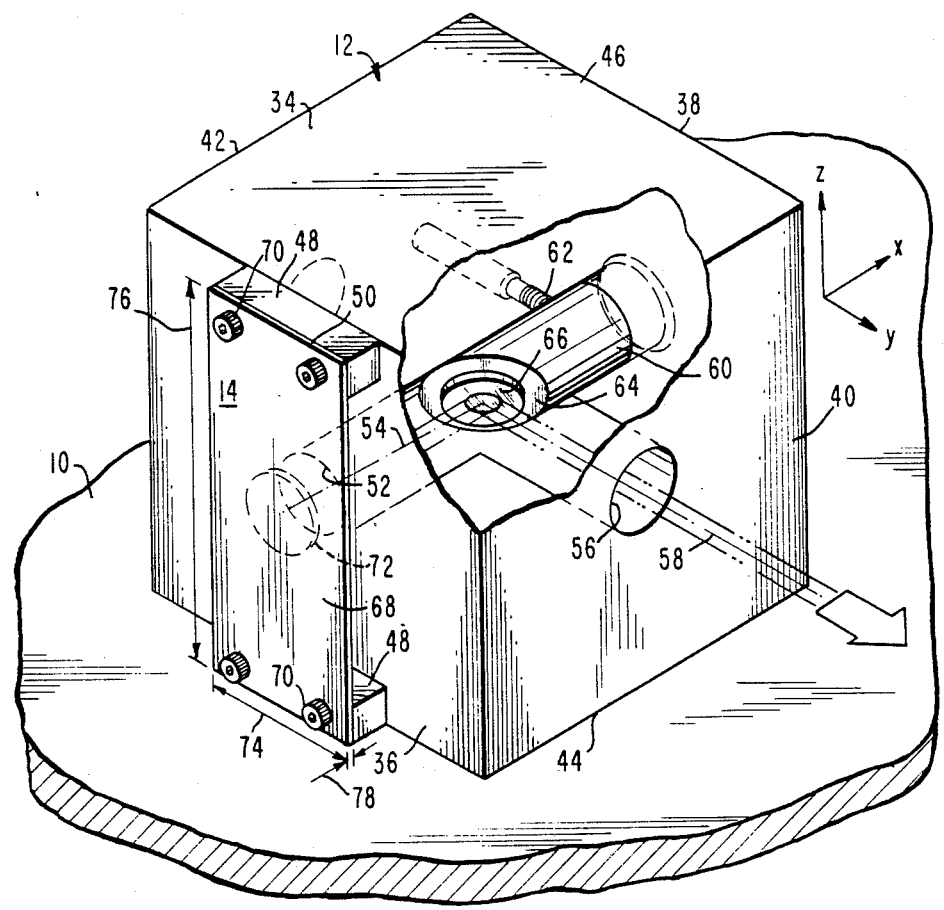
FIG. 2 is a three-dimensional view of the vibration sensor positioned with respect to an optical table for measurement of one orthogonal component of the vibrations exerted on the table.

Vibration sensor 12 is shown in greater detail in FIG. 2 and comprises a block 34 of generally right parallelepiped configuration defined by pairs of parallel sides 36 and 38, 40 and 42, and 44 and 46. A pair of extensions 48 extend from side 36 and terminate in surfaces 50. Surfaces 50 lie in the same plane and are parallel to the plane of side 36.

A bore 52 extends through and between parallel surfaces 36 and 38 and defines an axis 54 perpendicular thereto. A second bore 56 extends from bore 52 and terminates at side 40. Bore 56 is provided with an axis 58 which is perpendicular to axis 54. Bore 56 is so located that its axis 58 is equally distant from both surfaces 38 and 44.

A cylindrically shaped mount 60 is positionable within bore 52 and is removably secured therein by a set screw 62. Mount 60 is terminated at one end by a surface 64 which is angled at 45° with respect to its axis and, therefore, to axis 54 of bore 52. A reflective surface or mirror 66 is secured to mount surface 64, and mount 60 is so retained within bore 52 that any electromagnetic beam may be reflected along axes 54 and 58 of respective bores 52 and 56. It is also contemplated by the present invention that cylindrical mount 60 may be removed from bore 52 so that electromagnetic radiation may pass axially through bore 52 and through sides 36 and 38.

A structural beam 68, for example of aluminum, is rigidly affixed to surfaces 50 of extensions 48 by machine screws 70. At the centroid of beam 68, which is equidistant from extensions 48 and which is coaxial with axis 54 of bore 52, is placed a mirror 72 or equivalent reflective surface. Beam 68 has a width 74 and a length 76 which are large with respect to its thickness 78 to insure that any deflection of mirror 72 will be along axis 54 and restrained from motion in any direction other than along axis 54.

In the use of the present invention, a plurality of beams 68 are provided with similar mirrors 72 secured thereto at their centroids, the several structural beams having different thicknesses 78 so as to range from one which is substantially nondeflectable to varying degrees of deflection, for purposes to be presently explained.

In use, block 34 is adapted to be secured to optical table 12 in several positions for detecting and three dimensional measuring of components of vibrations along the x-, y- and z-axes, shown in FIG. 2. One position is an affixation of side 44 to the optical table. With mount 60 and mirror 66 in place, reflections to and from mirror 72 on structural beam 68 are along axes 54 and 58 of bores 52 and 56, for directing electromagnetic radiation along the y-axis. With mount 60 removed from bore 52, electromagnetic radiation is directed along axis 54 along the x-axis. Block 34 may also be affixed to optical table 12 on its side 38 so that deflections of mirror 72 along axis 54 is along the z-axis. Securement of block 34 to optical table 12 may be made by any suitable means, such as by an epoxy, which would also permit removal of the block from the optical table when desired.

Motion of mirror 72 relative to block 34 and optical table 12 is measurable as related to motion of the optical table, in accordance with the following equation:

$$x(\omega) = \delta \frac{1 - \left(\frac{\omega}{\omega_n}\right)^2}{\left(\frac{\omega}{\omega_n}\right)^2}$$

where x=the motion of optical table 10, $\delta$=the measured motion, $\omega$=the frequency of the measured motion, and $\omega_{n178}$ =the natural frequency of beam 68, which is defined as (k/m), k being the spring rate of beam 68 and m the mass of mirror 72. From this equation, when the amplitude and frequency of the measured motion of optical table 12 is known, the amplitude and frequency of the vibration on the optical table can be directly computed. The amplitude and frequency of the motion of the vibrating beam 68 is determined by utilizing the beam-mirror assembly as an element in an interferometer setup depicted in FIG. 1. The output of the interferometer in terms of the voltage to current ratio of detector 16 is processed with a frequency analyzer 80 to determine the magnitude and frequency of the beam's vibration relative to the optical table.

The measurement procedure is as follows. Vibration sensor 12 is positioned on optical table 10 with one of its sides 38 or 40 securely affixed thereto. The sensor is so oriented that the direction of motion of beam 68 corresponds with the desired x-, y- or z-axis of the optical table. A calibration beam 68 is installed on surfaces 50 of extensions 48 by screws 70. The calibration beam selected is such as to be substantially incapable of deflection. The remainder of the interferometer is assembled as shown in FIG. 1 with laser 14, detector 16, piezoelectric transducer 18, and beam splitter 20 affixed also to table 10. Electrically coupled to the piezoelectric transducer are a driver 82. A signal generator 84 for generating, for example, a sine wave signal, is coupled to driver 82 and to an oscilliscope 86. A digital multimeter 88 is electrically connected to driver 82.

Coupled to detector 16 is a preamplifier 90, which is powered by a battery 92, and the preamplifier is electrically connected to a digital multimeter 94, an oscilliscope 96, frequency analyzer 80 and an x-y plotter 98.

The interferometer is calibrated by moving a reference flat 100, driven by piezoelectric transducer 18, through one fringe of motion and by recording both the detector delta voltage and the delta voltage of the piezoelectric transducer. Driving of the piezoelectric transducer is through signal generator 84 and driver 82. Driving of transducer 18 and recording of the delta voltages of detector 16 and transducer 18 are repeated several times to verify the calibration.

After calibration, the relatively inflexible beam and mirror assembly 68-72 used for calibration as beam 68 is removed and a less thick vibration beam 68 is installed. A typical thickness for calibration beam is 0.125 inches. Typical thicknesses of vibration beams 68 include thicknesses of 0.001 inches, 0.005 inches and 0.010 inches. The particular thickness of the beam selected depends upon the ability to resolve the interferometer signal and the desired frequency range of the vibrations in question. For example, if one signal cannot be resolved, it is then necessary to use a thinner vibrating beam.

After the selected vibration beam 68 is installed, that beam is calibrated by giving sensor 12 a light, quick tap with a hard object in the direction of beam vibration, that is, along axis 54. Frequency analyzer 80 should record a resonent peak at the natural frequency of the beam (e.g. 100 to 110 Hertz for a 0.01 inch thick beam), which value is recorded along with any other resonances present. Knowledge of the resident peak and other resonances present is important in the use of the present invention. This calibration measurement is repeated a few times to verify the calibration.

The facility in which the setup is placed, for example one using a laser, is then closed. Any equipment to be utilized with the optical table is then turned on, such as air conditioning within the room and a laser water pump. The facility is permitted to reach steady-state conditions, generally a period of 15 to 20 minutes. A Fast Fourier Transform (FFT) of the interferometer signal is obtained by the frequency analyzer, in approximately 4 seconds to 10 minutes in duration. The data therefrom is plotted on plotter 98. Fast Fourier Transforms are also obtained with only the air conditioning turned off, and with both the air conditioning and the laser water pump turned off.

After having obtained the necessary data along the axis 54, as aligned in one of the x-, y- and z-axis directions, sensor 12 is then reoriented so that axis 54 extends along another of the two other of the x-, y- and z-axes for obtaining separate data as to each of those directions.

The information thus obtained as to the three orthogonal components of the vibrations exerted on table 10 is then used to compensate for use of the optical table in optical experiments, or for other use.

Experimental evidence obtained from use of the present invention provided a sensor sensitivity of 0.01 microgravities or less, compared to the most sensitive commercial accelerometer sensitivity which is limited to 2-3 microgravities.

Although the invention has been described with respect to a particular embodiment thereof, it should be realized that various changes and modifications may be made therein without departing from the spirit and scope of the invention.

I claim:

1. A system for measuring unidirectional vibration displacements on a device comprising:
   a sensor affixed to the device and including a structural beam which is secured at its ends with respect to the device, and which is selected in dimension to enable it to vibrate within a selected frequency range exertable on the device for constraining movement of said seismic reference substantially in a single direction, and a reflective element which is secured to said structural beam at its centroid; and
   an interferometer for detecting the unidirectional movement,
   said sensor comprising a block having
   first through fifth exterior surfaces, said first, second and third surfaces defining planes which lie perpendicular to one another and said fourth surface defining a plane which is parallel to said first surface,
   said reflective element and said structural beam being secured to said sensor on said first surface,
   first means defining a through bore extending between said first and fourth surfaces and aligned with said reflective element,
   second means defining a bore intersecting said first bore means and extending parallel to said second surface and perpendicularly from said first bore means through said surface, said second bore means lying equidistantly from said second and fourth surfaces, and
   a reflective surface positioned at the intersection between said first and second bore means for enabling electromagnetic energy to be reflected therebetween.

2. A system according to claim 1 in which said reflective surface is removable from said first bore means to enable transmission of electromagnetic energy between and through said first and fourth surfaces.

3. A system according to claim 2 in which said second, third and fourth surfaces are positionable on the device to measure unidirectional vibrations respectively in three orthogonal directions.

4. A system according to claim 3 in which said structural beam is selected in dimension to enable its vibration within a selected frequency range exertable on the device.

5. A system according to claim 4 wherein said interferometer comprises a laser and a piezoelectric transducer aligned on a first axis, a detector and said block on a second axis which crosses and is orthogonal to said first axis, a beam splitter positioned 45° to said first and second axes, a calibration circuit coupled to said piezoelectric transducer, and an analyzing circuit coupled to said detector.

6. A system for measuring unidirectional vibration displacements on a device comprising:
   a sensor affixed to the device and including a seismic reference with means for constraining movement of said seismic reference substantially in a single direction, said sensor comprising a block having
   first through fifth exterior surfaces, said first, second and third surfaces defining planes which lie perpendicular to one another and said fourth surface defining a plane which is parallel to said first surface,
   first means defining a through bore extending between said first and fourth surfaces and aligned with said seismic reference,
   second means defining a bore intersecting said first bore means and extending parallel to said second surface and perpendicularly from said first bore means through said surface, said second bore means lying equidistantly from said second and fourth surfaces, and
   a reflective surface positioned at the intersection between said first and second bore means for enabling electromagnetic energy to be reflected therebetween; and
   means for detecting the unidirectional movement.

7. A system according to claim 6 in which said movement constraining means comprises a structural beam secured at its ends with respect to the device, and said seismic reference includes a reflective element secured to said structural beam at its centroid.

8. A system according to claim 6 in which said detecting means comprises an interferometer.

9. A system according to claim 6 in which said movement constraining means comprises a structural beam secured at its ends with respect to the device.

10. A system according to claim 6 in which said seismic reference includes a reflective element.

11. A system according to claim 10 in which said movement constraining means comprises a structural beam secured at its ends with respect to the device.

12. A system according to claim 11 in which said structural beam is selected in dimension to enable its vibration within a selected frequency range exertable on the 13. A system according to claim 12 in which said reflective element is secured to said structural beam at its centroid.

14. A system according to claim 13 in which said detecting means comprises an interferometer.

* * * * *

UNITED STATES PATENT AND TRADEMARK OFFICE
CERTIFICATE OF CORRECTION

PATENT NO. : 4,905,519

DATED : March 6, 1990

INVENTOR(S) : M. David Makowski

It is certified that error appears in the above-identified patent and that said Letters Patent is hereby corrected as shown below:

Column 6, line 62, after "the", add --device.--.

Signed and Sealed this

Thirteenth Day of August, 1991

Attest:

HARRY F. MANBECK, JR.

Attesting Officer

Commissioner of Patents and Trademarks